Figure 1:
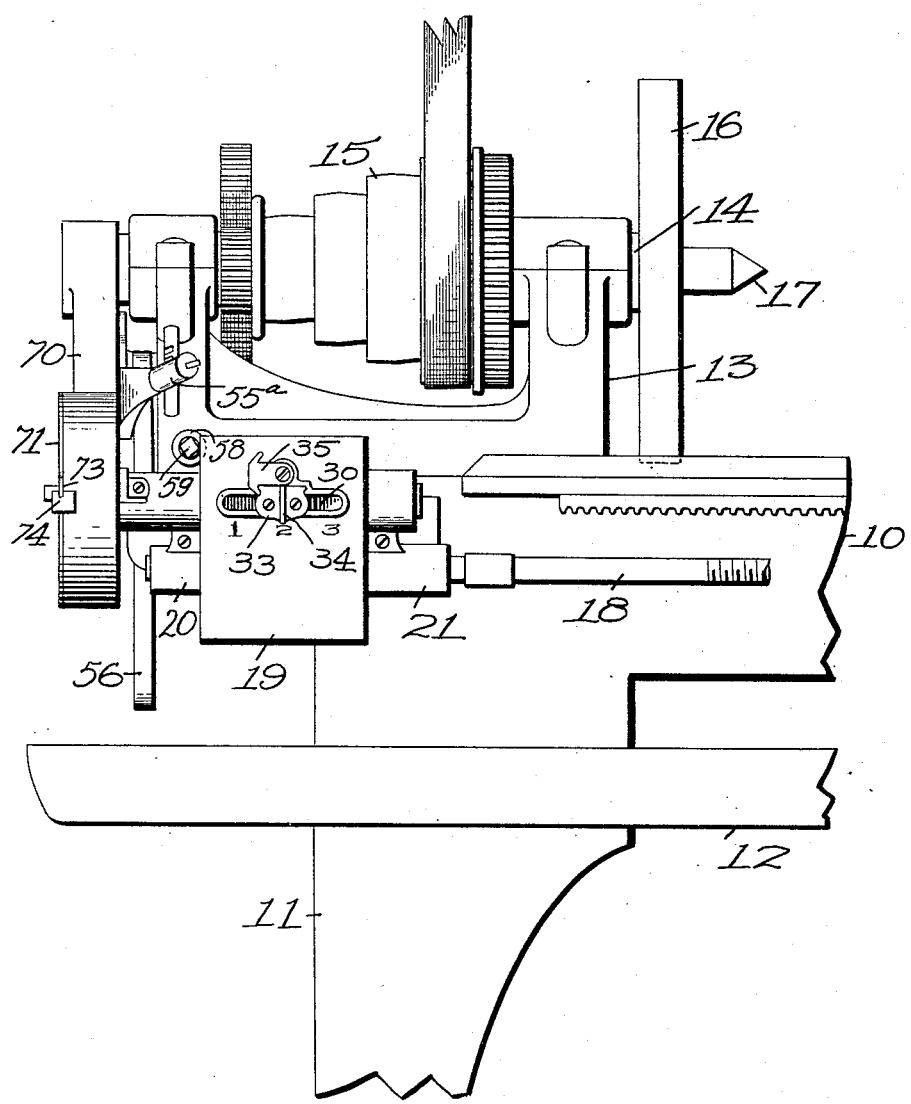

A. W. WHITCOMB.
GEARING FOR LATHES.
APPLICATION FILED NOV. 27, 1914.

1,171,995.

Patented Feb. 15, 1916.
3 SHEETS—SHEET 1.

Witnesses:
C. F. Wesson
B. L. Hartnett

Inventor.
A. W. Whitcomb.
By attorneys
Southgate & Southgate

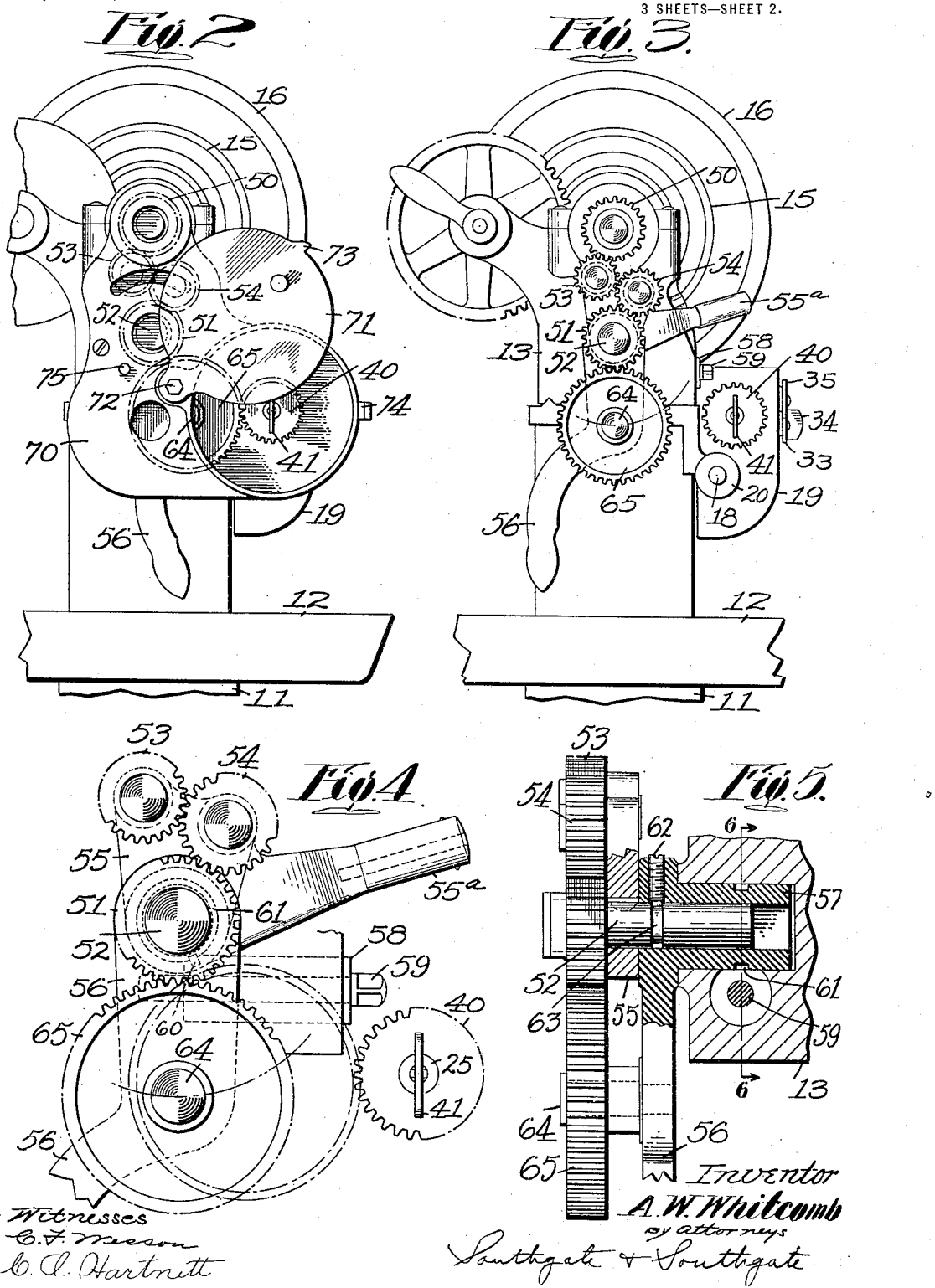

A. W. WHITCOMB.
GEARING FOR LATHES.
APPLICATION FILED NOV. 27, 1914.
1,171,995.
Patented Feb. 15, 1916.
3 SHEETS—SHEET 3.
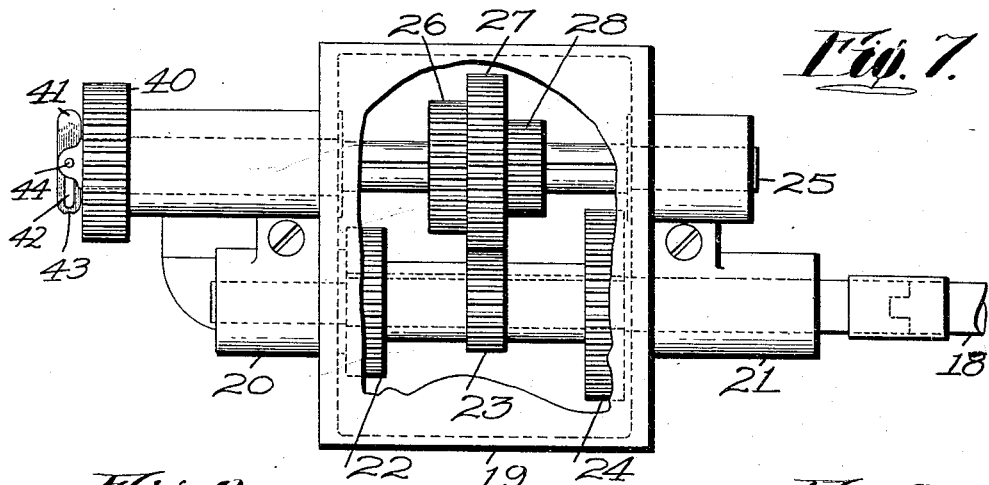
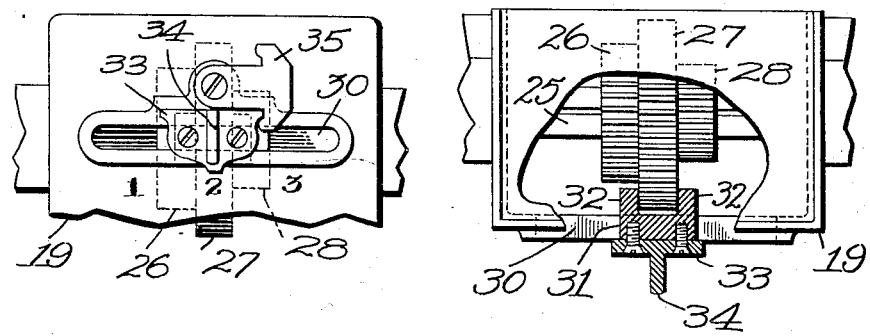
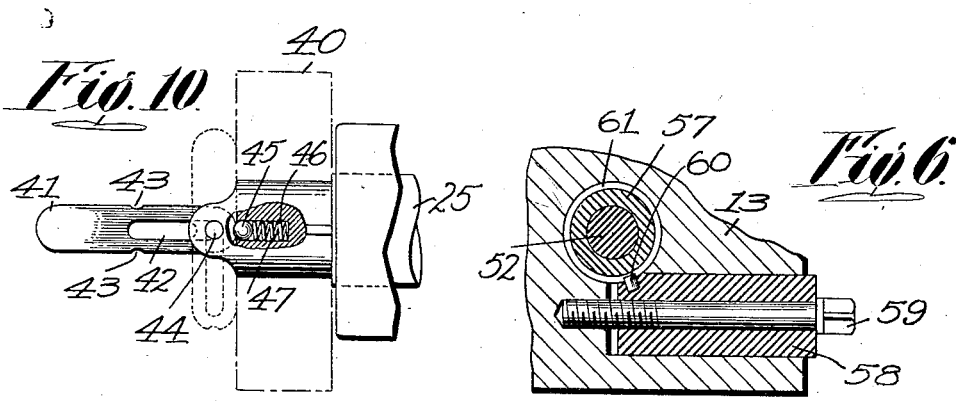
Witnesses:
C. F. Mason
C. A. Hartnett
Inventor
A. W. Whitcomb
By attorneys
Southgate & Southgate
THE COLUMBIA PLANOGRAPH CO., WASHINGTON, D. C.

UNITED STATES PATENT OFFICE.

ALONZO W. WHITCOMB, OF WORCESTER, MASSACHUSETTS.

GEARING FOR LATHES.

1,171,995. Specification of Letters Patent. Patented Feb. 15, 1916.

Application filed November 27, 1914. Serial No. 874,158.

*To all whom it may concern:*

Be it known that I, ALONZO W. WHITCOMB, a citizen of the United States, residing at Worcester, in the county of Worcester and State of Massachusetts, have invented a new and useful Gearing for Lathes, of which the following is a specification.

This invention relates to a lathe and particularly to improved devices for driving the lead screw thereof.

In an engine lathe it is necessary to make provision by which the speed of rotation of the lead screw may be varied relative to that of the spindle. To secure this change in relative speed, it has been customary to provide a change gear mounted upon a swinging arm and means for angularly adjusting the swinging arm so that the particular change gear in use may be brought into mesh with the pinion upon the lead screw. With this arrangement, it is necessary to adjust the change gear stud upon the swinging arm for each different change gear, in addition to adjusting the arm itself with relation to the lead screw pinion.

It is one object of my invention to improve upon this construction by mounting the change gear upon an intermediate shaft which rotates in fixed bearings. With this arrangement there is no adjustment of the shaft which carries the change gear and it is merely necessary to change the position of the swinging arm in order to bring the driving gears into proper relation. It is found, however, that this arrangement alone is not practicable where a wide range of feeds is desired, as change gears of prohibitive size would be required.

Accordingly, it is a further object of my invention to provide means for changing the speed of rotation of the lead screw relative to the intermediate shaft.

In the preferred form of my invention I provide a set of gears upon the lead screw and a corresponding set of gears slidable upon and rotatable with the intermediate shaft. When three gears are provided upon the lead screw and a similar number upon the intermediate shaft, it is necessary to use only one-third as many change gears to secure a given range of feeds.

A further object of my invention is to provide an improved detachable fastening for securing the change gear upon the intermediate shaft.

With this and other objects in view, my invention comprises certain devices, arrangements and combinations of parts as will be hereinafter described and more particularly pointed out in the appended claims.

A preferred form of my invention is shown in the drawings in which,

Figure 1 is a side elevation of a portion of a lathe having my improved devices embodied therein; Fig. 2 is a left-hand end elevation of the portion of the lathe shown in Fig. 1; Fig. 3 is a view similar to Fig. 2 with the gears in a different position and the gear covers removed; Fig. 4 is an enlarged detail view of a portion of the gear connections between the spindle and the intermediate shaft; Fig. 5 is a side elevation partially in section of the parts shown in Fig. 4; Fig. 6 is a detail sectional view taken along the line 6—6 in Fig. 5; Fig. 7 is an enlarged front elevation of the driving connections between the intermediate shaft and the lead screw; Figs. 8 and 9 are detail views of the devices for sliding the shift gears upon the intermediate shaft; and Fig. 10 is an enlarged detail view of the locking plate for detachably securing the change gear upon the intermediate shaft.

I have shown my improved device as applied to an engine lathe of ordinary form having a bed 10 supported upon legs 11 and provided with an oil pan 12. The headstock 13 is mounted upon the bed and provides bearings for the spindle 14 carrying the cone driving pulley 15, the face plate 16, and the live center 17. Back gears of the usual type are also provided for changing the speed ratio between the cone pulley 15 and the spindle 14. A lead screw 18 is mounted in the usual position at the front of the bed, the left-hand end of the lead screw extending into a shift gear box 19. The lead screw is supported in bearings 20 and 21 (Fig. 7) at each side of the box 19. A plurality of gears 22, 23 and 24 are fixed to the lead screw within the box 19. An intermediate shaft 25 is mounted in bearings above the lead screw 18 and supports a plurality of shift gears 26, 27 and 28 within the shift gear box. These gears are secured together and are slidable along the shaft 25, while at the same time they are keyed, or otherwise secured, to rotate with the shaft.

The front plate of the gear box 19 is provided with a longitudinal slot 30 in which is fitted a sliding block 31 having inwardly projecting lugs 32 adapted to extend upon each side of the gear 27, as shown in Fig. 9. The block 31 is also provided with a plate 33 positioned outside of the box and having a projection 34 by which it may be conveniently moved in the slot 30. With this construction, it will be evident that movement of the block 31 along the slot 30 will bring any one of the three pairs of gears within the box into operative relation. In its middle position, the gear 27 will mesh with the gear 23 and the lead screw will rotate at higher speed than the intermediate shaft. When the block is moved to the left, the gear 26 will mesh with the gear 22 and the shafts will rotate at substantially the same speed, while movement of the block to the right will cause the gear 28 to mesh with the gear 24, which combination causes the lead screw to rotate much slower than the shaft 25.

In order to facilitate the meshing of the gears 27 and 23, I provide the pivoted stop 35 shown in Figs. 1 and 8. If the block is in the position indicated as No. 1 in said figures and the operator wishes to remove the block to position No. 2, he moves the pivoted stop to the position shown in Fig. 8 in which position it engages the right-hand end of the plate 33 and positions the sliding block so that the gears 27 and 23 are in operative position. If the block is in position No. 3 and it is desirable to move it to position No. 2, the pivoted stop 35 is moved to the position shown in Fig. 1.

At its left-hand end, the intermediate shaft 25 is provided with means for adjustably securing any one of a series of change gears 40 thereon. The means for securing the gear in place is clearly shown in Fig. 10 and comprises a locking plate 41 having a longitudinal slot 42 therein, and also provided with a plurality of notches 43 in its outer edge. A stud 44 is mounted in ears formed on the end of the shaft 25 and extends transversely through the slot 42. When the locking plate is positioned as shown in full lines in Fig. 10, a change gear 40 may be readily passed thereover, but when the plate is placed in the position indicated in dotted lines in said figure, the gear is securely held upon the shaft.

In order to retain the plate in either one of the positions indicated, I provide a ball 45 mounted to slide longitudinally in the recess 46 formed in the end of the shaft 25. A spring 47 positioned within the recess forces the ball outwardly into position to coöperate with one of the notches 43 to hold the locking plate yieldingly in its selected position.

The spindle 14 is provided at its rear end with a driving pinion 50 (Fig. 3) and a gear 51 is mounted upon a fixer stud 52 on the head-stock 13. Reversing gears 53 and 54 provide a driving connection between the pinion 50 and the gear 51. The gears 53 and 54 are mounted upon studs fixed in a reversing plate 55 provided with a handle 55ª and mounted to swing about the axis of the stud 52. In one position the gear 54 meshes directly with the pinion 50, while in the reverse position the gear 53 meshes with the gear 50 and the gear 54 acts as an intermediate gear in the usual manner. A depending arm 56 is also mounted to swing about the axis of the stud 52, the arm being provided with a hub 57 having a bearing in the head-stock 13.

The arm 56 is held in adjusted angular position relative to the head-stock by the binding device shown in Figs. 5 and 6. This device comprises a bushing 58 having a portion of its inner end formed to correspond in curvature to the surface of the hub 57 and having a binding screw 59 extending therethrough into the head-stock 13. Tightening of the binding screw forces the bushing against the hub 57, thus clamping the hub securely within the head 13. The bushing 58 also carries a pin 60 positioned to coöperate with a groove 61 in the hub 57, thereby preventing longitudinal displacement of the hub in its recess. The hub is bored out through its center to provide a bearing for the stud 52 and is also provided with a set screw 62 extending into a groove 63 in the stud 52 and preventing longitudinal movement of the stud relative to the hub 57.

The entire driving connection between the pinion 60 and the change gear 40 may be removed by loosening the binding bushing 58, while the gear 51, the reversing gears 53 and 54, and the reversing plate 55 may be removed from the arm 56 by loosening the set screw 62. The arm 56 carries a stud 64 which provides a bearing for the large transmission gear 65.

In order to change the speed ratio between the spindle 14 and the intermediate shaft 25 it is merely necessary to place the proper change gear 40 upon the shaft 25 and to thereafter swing the arm 56 into such position that the transmission gear 65 will mesh with the new change gear. The arm 56 is then secured in adjusted position by tightening the screw 59 on the bushing 58. If the change in speed ratio is beyond the limits of the change gears provided, the shift gears in the box 19 may be adjusted to secure the desired ratio.

It has been shown that the gear 40 is the only gear to be changed in securing a desired feed ratio. The necessary angular adjustment of the arm 56 is also much reduced by the use of the shift gears described. I am thus enabled to use the very compact gear cover shown in the drawings. This gear cover comprises a fixed casing 70 (Figs. 1 and 2) formed of one or more parts and fixed to the head 13. Upon the casing 70 there is pivotally mounted a cover plate 71 secured thereto by a stud 72 and having a projection 73 engaging a stop 74 upon the casing 70. When a change is to be made in the gear 40, the cover 71 may be swung upward until it engages a stop 75 upon the casing 70.

Having thus described my invention, it will be evident that many changes and modifications can be made therein by those skilled in the art without departing from the spirit and scope thereof as set forth in the claims, and I do not wish to be limited to the details herein disclosed, but

What I do claim is:—

1. In a lathe, a combination, a head stock, a spindle, a lead screw, and an intermediate shaft positioned parallel to said lead screw, a pinion on said spindle, a change gear on said intermediate shaft, driving connections from said pinion to said change gear, and a cover for said gears comprising a casing fixed to the head-stock and having an opening therein concentric with said intermediate shaft and change gear, a cover plate for said opening, and means to support the cover plate in position to close said opening.

2. In a lathe, in combination, a lead screw, an intermediate shaft paralled to said lead screw, a set of gears fixed to said lead screw, a set of gears slidable on said intermediate shaft, a box inclosing said sets of gears and having a slot in the front thereof, a gear-shifting block slidable in said slot, and a reversible stop movable into position to stop said block in mid-position when moved in either direction.

3. In a lathe, in combination, a spindle, a pinion on said spindle, a lead screw, an intermediate shaft positioned parallel to said lead screw and rotatable in fixed bearings, shiftable gear connections between said intermediate shaft and said screw, a change gear on said shaft, an arm movable about a fixed center, a driven gear rotatable about the pivot of said arm, reversible means to drive said gear from said pinion, and driving connections on said arm for driving said change gear from said driven gear, said arm and the entire driving connections from said pinion to said change gear being removable as a unit from said lathe.

4. In a lathe, in combination, a spindle, a pinion on said spindle, a lead screw, an intermediate shaft positioned parallel to said lead screw and rotatable in fixed bearings, shiftable gear connections between said intermediate shaft and said screw, a change gear on said shaft, an arm movable about a fixed center, a driven gear rotatable about the pivot of said arm, reversible means to drive said gear from said pinion, and driving connections on said arm for driving said change gear from said driven gear, the driven gear and the reversible connections from said pinion to said gear being supported upon a single stud and removable as a unit from said lathe.

In testimony whereof I have hereunto set my hand, in the presence of two subscribing witnesses.

ALONZO W. WHITCOMB.

Witnesses:
B. ALFRED WHEELER,
CLARENCE F. WHITE.

Copies of this patent may be obtained for five cents each, by addressing the "Commissioner of Patents, Washington, D. C."